United States Patent [19]
Hannum

[11] Patent Number: 5,992,644
[45] Date of Patent: Nov. 30, 1999

[54] PLASTIC FLIGHT TYPE WATER TREATMENT SYSTEM FOR RECTANGULAR CLARIFIERS

[75] Inventor: Joseph R. Hannum, Blue Bell, Pa.

[73] Assignee: Polychem Corporation, Phoenixville, Pa.

[21] Appl. No.: 09/098,113

[22] Filed: Jun. 16, 1998

Related U.S. Application Data

[62] Division of application No. 08/638,817, Apr. 29, 1996, Pat. No. 5,788,837.

[51] Int. Cl.[6] .................................................. B01D 21/20
[52] U.S. Cl. .......................... 210/525; 210/526; 198/834; 474/88; 474/150; 474/156; 474/164
[58] Field of Search ..................................... 210/523, 525, 210/526, 144, 145; 198/728, 730, 834; 474/84, 88, 150, 155, 156, 164, 207, 900

[56] References Cited

U.S. PATENT DOCUMENTS

| | | | |
|---|---|---|---|
| 1,714,739 | 5/1929 | Tark | 210/526 |
| 1,763,412 | 6/1930 | Tark | 210/526 |
| 1,795,143 | 3/1931 | Roddy | 210/526 |
| 1,864,778 | 6/1932 | Tark . | |
| 1,882,930 | 10/1932 | Roddy | 210/526 |
| 2,233,448 | 3/1941 | Fischer . | |
| 2,264,912 | 12/1941 | Kupper | 210/525 |
| 2,525,516 | 10/1950 | Bergmann et al. | 474/164 |
| 2,698,078 | 12/1954 | Harrison | 198/834 |
| 2,965,217 | 12/1960 | Dommann et al. | 198/728 |
| 3,140,774 | 7/1964 | Johnston et al. | 210/526 |
| 3,244,280 | 4/1966 | Lind et al. | 210/526 |
| 3,313,422 | 4/1967 | Swenson | 210/525 |
| 3,394,816 | 7/1968 | Lowry | 210/525 |
| 3,674,145 | 7/1972 | Schmutzler et al. | 210/526 |
| 3,675,778 | 7/1972 | Hoag | 210/498 |
| 3,768,657 | 10/1973 | Hoag | 210/526 |
| 3,795,316 | 3/1974 | Wood | 210/526 |

(List continued on next page.)

FOREIGN PATENT DOCUMENTS

WO 9320294  10/1993  WIPO .

OTHER PUBLICATIONS

Hitachi Maxco, Ltd., "Environmental Products", 4 Pages, Undated.
Hitachi Maxco, Ltd., "Product Bulletin SAV 715 Stainless", 2 Pages, Undated.
Hitachi Maxco, Ltd., "Product Bulletin HB–78 Stainless", 2 Pages, Undated.
Polychem Corporation, Polychem Engineered Non–Metallic NCS–720–S Chain; Cast Nylon Sprockets & Corrosion Resistant Systems & Components:, 4 Pages, Jun., 1995.
Rex Chains, "Rex Loop Chain For Heavy Duty Sludge Collector Service", 4 Pages, Sep., 1986.
The Budd Company, Non–Metallic Rectangular Clarifier Components For Water And Wastewater Treatment Applications, 12 Pages, Sep., 1989.
The Budd Company, "Engineered Plastic Conveyor Components", 4 Pages, Undated.

*Primary Examiner*—Christopher Upton
*Attorney, Agent, or Firm*—Harness, Dickey & Pierce, P.L.C.

[57] ABSTRACT

In accordance with the teachings of the present invention, a waste water treatment system for removing sludge from within a rectangular clarifying tank as provided. The waste water treatment system includes a plurality of sludge collector flights attached to a pair of parallel chains for collecting sludge and scum within the waste water. Each of the collector flights includes a non-metallic elongated main body portion having spaced top and bottom walls connected by spaced front and rear walls for defining a hollow, interior cavity. Buoyant foam material is disposed within the interior cavity for increasing the buoyancy of the collector flight. The waste water treatment system further includes integrated plastic bull and drive sprockets and a chain drive assembly for driving a pair of parallel drive chains attached to the integrated plastic bull and drive sprockets. The chain drive assembly includes dual drive shafts exterior to the waste water with each extending across half the width of the tank.

13 Claims, 9 Drawing Sheets

U.S. PATENT DOCUMENTS

| | | | |
|---|---|---|---|
| 4,192,747 | 3/1980 | Wykoff | 210/525 |
| 4,366,058 | 12/1982 | Wolde-Michael | 210/526 |
| 4,645,598 | 2/1987 | Hannum | 210/526 |
| 4,663,042 | 5/1987 | Rasper et al. | 210/525 |
| 4,766,997 | 8/1988 | Hannum | 474/208 |
| 4,810,383 | 3/1989 | Hannum | 210/525 |
| 5,035,681 | 7/1991 | Hertel et al. | 210/526 |
| 5,165,522 | 11/1992 | Uttke et al. | 210/526 |
| 5,200,079 | 4/1993 | Schwartz et al. | |
| 5,250,178 | 10/1993 | Casper et al. | 210/526 |
| 5,295,917 | 3/1994 | Hannum | 474/95 |
| 5,336,417 | 8/1994 | Hannum | 210/526 |
| 5,337,886 | 8/1994 | Anderson et al. | 198/728 |
| 5,469,958 | 11/1995 | Gruettner et al. | 198/834 |
| 5,518,109 | 5/1996 | Dailey et al. | 198/834 |
| 5,545,324 | 8/1996 | Workman | 210/525 |

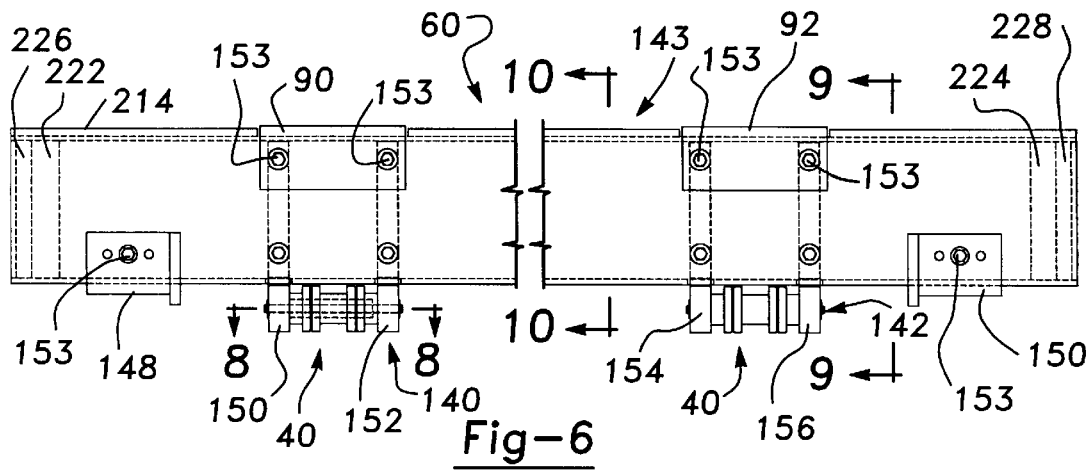
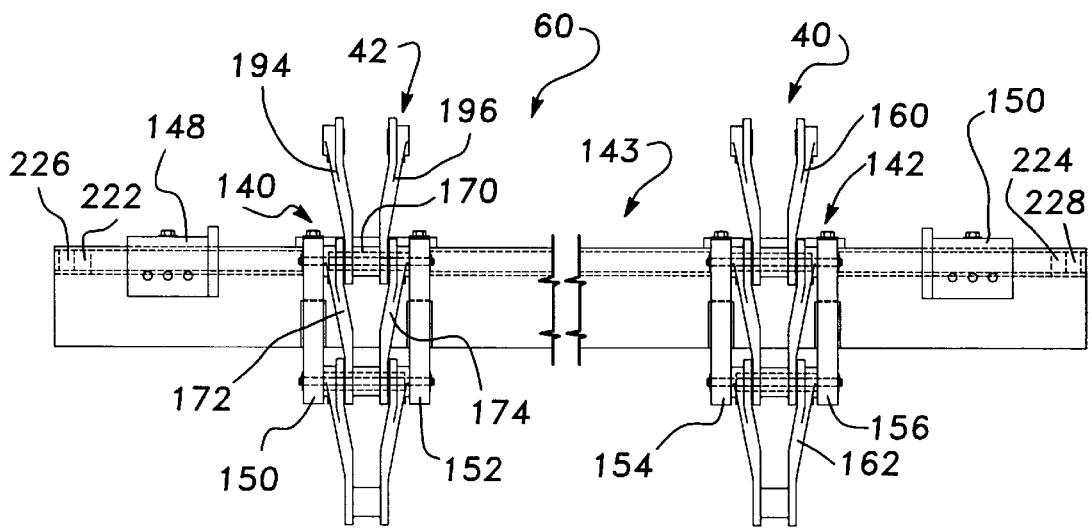
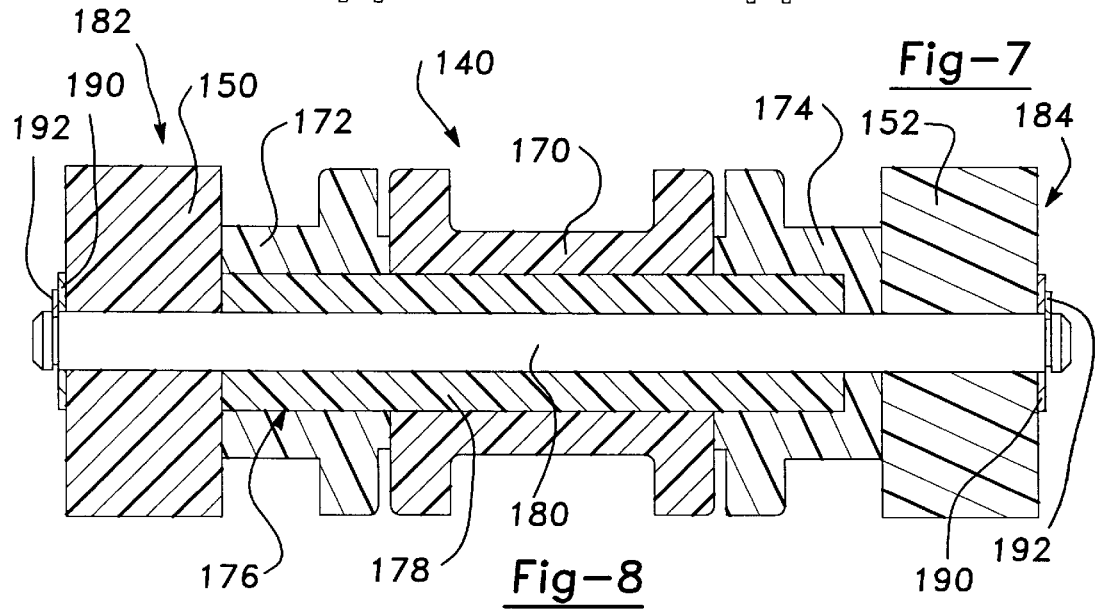

PLASTIC FLIGHT TYPE WATER TREATMENT SYSTEM FOR RECTANGULAR CLARIFIERS

This is a division of U.S. patent application Ser. No. 08/638,817, filed Apr. 29, 1996, now U.S. Pat. No. 5,788,837.

BACKGROUND OF THE INVENTION

1. Technical Field

This invention relates to water treatment systems and, more particularly, to a waste water treatment system for use in a rectangular clarifying tank and including plastic buoyant collector flights, integrated bull and drive sprockets, and a chain drive assembly with dual drive shafts.

2. Discussion of Related Art

The use of a water treatment system including a series of scraper or drag flights that are carried and driven by a pair of parallel conveyor chains throughout a rectangular clarifier, i.e. a rectangular concrete settling tank, is generally known in the art. Typically, the conveyor chains are driven by sprockets within the tank. Such a system is commonly employed for removing waste solids such as grit (i.e., non-biodegradable solids such as stones, sand, or glass), sludge and scum from the waste water in the tank. This type of waste water treatment system is commonly used in rectangular clarifying tanks having widths varying from 10 feet to 22 feet. Clarifying tanks of this size are typical for many applications in the United States. An example of such a system for tanks of this size is the waste water treatment system disclosed in commonly assigned U.S. Pat. No. 4,645,598 to Hannum which is hereby incorporated by reference. Generally, the series of flights this system move in one direction partially above the top surface of the waste water for pushing scum into a collector for its removal. Concurrently, other flights in the series move in an opposite direction along the bottom floor of the tank with the front faces of the flights collecting and gathering settled solid waste materials such as sludge. During this process, the flights may be subjected to heavy loads, commonly referred to as sludge loads, that are transferred to the other components of the system including, but not limited to, the conveyor chains, sprockets and drive assembly. In order to reduce the loads on the system's components, substantially all of the working parts are made from non-metallic material which is lightweight, minimizes wear between components, and has a high immunity to the corrosive environment within the clarifying tank.

Many clarifying tanks in the United States and in Europe have widths varying from 22 feet to 26 feet. Historically, the water treatment systems employed in these clarifiers have employ either steel or stainless steel conveyor chains, sprockets, and steel torque tube shafts in conjunction with wooden flights or steel bridge scraper systems. Unfortunately, such systems encounter many problems due to corrosion from the corrosive environment within the tanks as well as excessive wear between components, both of which create maintenance problems. Again, the type of system disclosed in U.S. Pat. No. 4,645,598, with minor modifications, may be used in clarifying tanks of this size in order to overcome such problems.

Typically, as the width of a settling tank is increased, the length a system's flights, as well as other hardware components, must also be correspondingly increased or strengthened for the removal of additional waste solids throughout the tank's additional surface area. A problem associated with simply increasing the length of the flights is that the flights will be subjected to greater sludge loads that may cause excessive center deflection of the flights. Such excessive deflection creates torsional loads as well as simultaneous twisting and bending of the flights that can cause the flights, the flight attachment links and/or other components of the system to fail. Similarly, such deflection often causes the wear shoes of the flights traveling along the top surface of the waste water to drop off return rails causing a potential system failure. Additionally, for many typical systems, as a tank is widened, the system's drive shaft, usually spanning the width of the tank, must also be lengthened. This may cause the drive shaft to deflect or bend due to an increase in its own weight.

In an attempt of overcome such problems, past waste water treatment systems have increased the mass of certain portions of the flights and associated hardware in order to increase the flight's strength, stiffness, and resistance to deflection. However, the increased mass and weight of the flights and associated hardware may create excessive loads that can cause failures of other components within the system.

Such problems are further compounded in rectangular clarifying tanks having widths greater than 26 feet. Many clarifying tanks have widths exceeding 32.8 feet (10 meters). For example, in Europe, many clarifying tanks have widths exceeding 39.36 feet (12 meters) and commonly employ steel bridge scraper systems that experience problems related to rusting and accelerated wear. For tanks of these sizes, the waste water, treatment system disclosed in commonly assigned U.S. Pat. No. 4,810,383 to Hannum, which is hereby incorporated by reference, overcomes the above-discussed problems in a cost effective manner. Briefly, this system employs a suspended cable system which divides the tank into multiple parallel clarifiers without the use of or expense of massive concrete structures required for steel bridge scraper systems.

Unfortunately, the use of this system in many existing rectangular clarifying tanks having widths between 26.24 feet (8 meters) and 35 feet (10.7 meters) may not be cost effective. Additionally, clarifying tanks having widths within this range may be too wide for the waste water treatment system disclosed in U.S. Pat. No. 4,645,598 to Hannum to be effective. Typically, previous waste water treatment systems used in clarifiers Slaving widths within this range, i.e., 8 meters to 10.7 meters, utilize steel conveyor chains, sprockets and sprocket shafts. As discussed above, steel components used in a waste water treatment system have high susceptibility to corrosion from exposure to the corrosive environment within the waste water treatment system during operation and maintenance procedures. In addition, steel components are heavy and prone to excessive wear. This combination of factors reduces the energy efficiency and durability of such steel systems and increases maintenance costs.

It is therefore desirable to provide a waste water treatment system for use in rectangular clarifying tanks having reduced weight for increased efficiency and durability as well as high immunity to corrosion and minimal wear between components.

More particularly, it is desirable to provide a water treatment system with buoyant non-metallic collector flights exhibiting minimal deflection during operation as well as non-metallic flight attachment links, non-metallic integrated bull and drive sprockets and a chain drive assembly with dual drive shafts.

It is further desirable to provide a waste water treatment system for use in a rectangular clarifying tank having a width within the range of 8 meters to 10.7 meters and that has reduced weight, wear and high immunity to corrosion.

SUMMARY OF THE INVENTION

In accordance with the teachings of the present invention, a waste water treatment system for use in a settling tank partially filled with waste water is disclosed. The system includes a pair of parallel spaced plastic chains extending throughout the length of the tank. A plurality of plastic sprockets are disposed throughout the tank for engaging and driving the pair of chains. A plurality of buoyant sludge collector flights extending transversely to and connected to the pair of chains for collecting sludge from the bottom surface of the settling tank and for skimming the top surface of the waste water for collecting scum are provided. Each of the sludge collector flights include a non-metallic elongated main body portion having spaced top and bottom walls connecting spaced front and rear walls for defining a hollow, interior cavity. The interior cavity is substantially filled with a buoyant foam material for increasing the buoyancy of the collector flight.

In accordance with a preferred embodiment, the waste water treatment system further includes a chain drive assembly located at an end of the tank and exterior to the waste water for driving a pair of parallel drive chains which are coupled to a pair of plastic sprockets located within the settling tank. The chain drive assembly includes a pair of axially aligned drive shafts each extending across approximately half the width of the tank. Drive sprockets are provided on ends of the drive shafts for engaging and driving the parallel drive chains and, in turn, the pair of sprockets within the tank.

In accordance with another preferred embodiment, integrated dual sprocket assemblies are provided within the settling tank and include a first plastic sprocket with a hub portion coupled to a hub portion of a second plastic sprocket. The teeth of the first and second sprockets are aligned for rotation on a shaft member.

BRIEF DESCRIPTION OF THE DRAWINGS

The various advantages of the present invention will become apparent to those skilled in the art after reading the following specification and by reference to the drawings in which:

FIG. 6 is a front view of a representative sludge collector flight in accordance with the teachings of the present invention;

FIG. 7 is a bottom view of the representative collector flight in accordance with the teachings of the present invention;

FIG. 8 is a cross sectional view, along line 8—8 of FIG. 6, of the flight attachment link assembly in accordance with the teachings of the present invention;

DETAILED DESCRIPTION OF THE PREFERRED EMBODIMENTS

The following description of the preferred embodiments is merely exemplary in nature and is in no way intended to limit the invention or its application or its uses.

The present invention is particularly concerned with providing a waste water treatment system for the removal of sludge and scum from a rectangular clarifier, i.e. a rectangular settling tank, partially filled with waste water. However, the present invention is not limited to the removal of sludge and scum but may be used in conjunction with other steps involved in the process of treating waste water such as, but not limited to, the removal of grit from a settling tank. The system advantageously uses plastic components in order to minimize weight, wear, and corrosion in order to increase the system's energy efficiency and durability. In accordance with the present invention, the waste water treatment system will be described in conjunction with a settling tank having a width of ten (10) meters, but the system is not limited to such an application and may be advantageously used in tanks with different widths.

Figure 1:
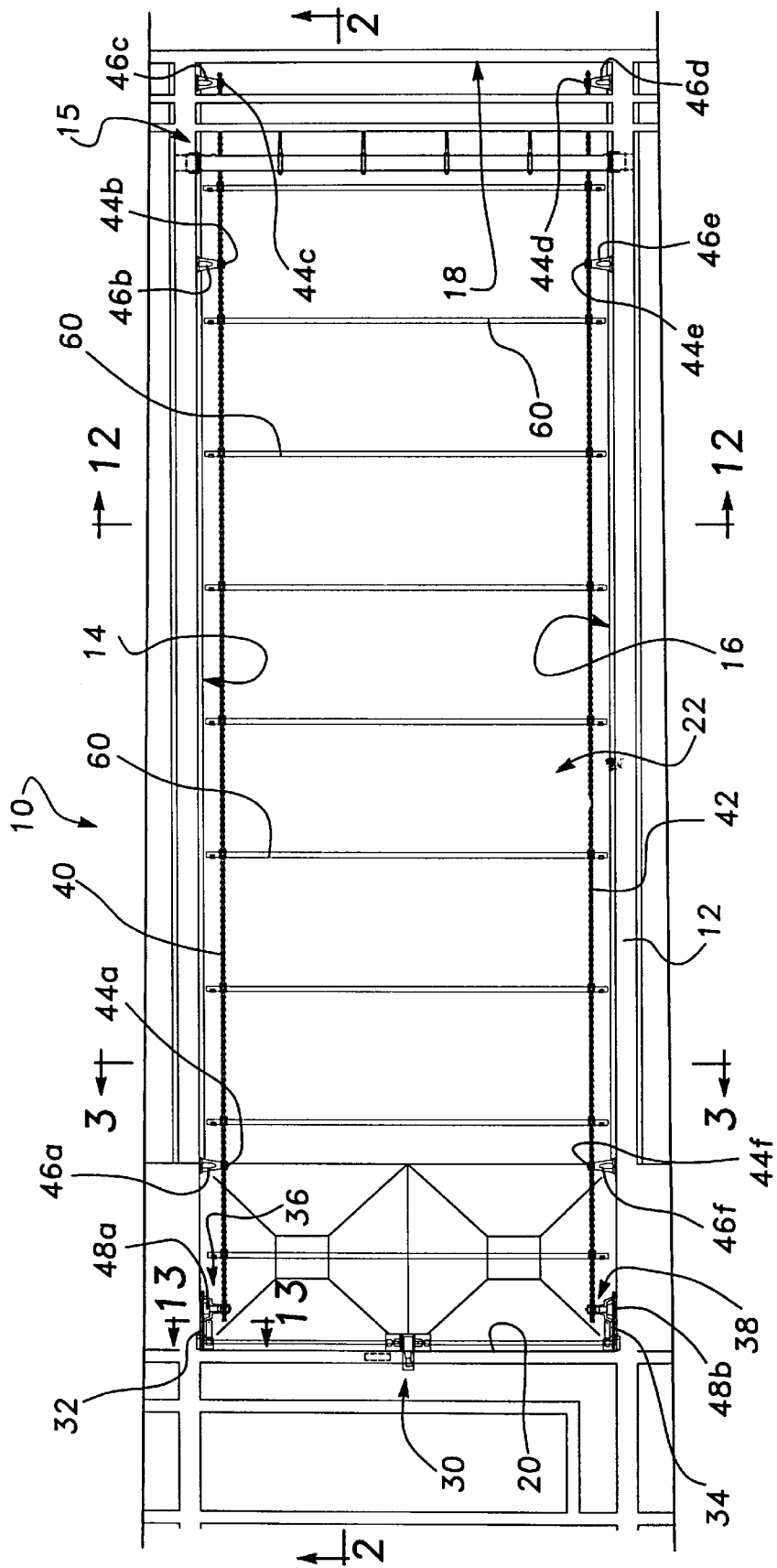
FIG. 1 is a plan view of a ten (10) meter wide clarifier tank containing the waste water treatment system including sludge collector flights with plastic attachment link assemblies, integrated dual sprocket assemblies, and chain drive assembly in accordance with the teachings of the present invention.

Turning to FIG. 1, a waste water treatment system 10 including a rectangular settling tank 12 having a width of ten (10) meters between side walls 14 and 16 is shown. The tank 12 further includes end walls 18 and 20 and a bottom surface 22. During operation, the tank 12 is partially filled with waste water (not shown) for treatment. The system 10 includes a motorized chain drive assembly 30 adapted for driving a pair of parallel plastic drive chains 32 and 34. The drive chains 32 and 34 in turn drive integrated dual sprocket assemblies 36 and 38 located within the tank 12 When driven, the integrated dual sprocket assemblies 36 and 38 drive a pair of plastic conveyor chains 40 and 42 which extend throughout the interior of the tank 12. The chains 40 and 42 are adapted for engaging plastic idler sprockets 44*a*, 44*b*, 44*c*, 44*d*, 44*e* and 44*f*. Each of the idler sprockets 44*a*–44*f* rotate freely on stub posts 46*a*, 46*b*, 46*c*, 46*d*, 46*e* and 46*f* which are of the type disclosed and described in U.S. Pat. No. 4,645,598 to Hannum. The stub posts 46*a*–46*f* are securely coupled to the side walls 14 and 16. Similarly, the dual sprocket assemblies 36 and 38 rotate on stub posts 48*a* and 48*b*.

When driven by chain drive assembly 30 and, in turn, the sprocket assemblies 36 and 38, the chains 40 and 42 rotate freely on idler sprockets 44*a*–44*f*. A series of sludge collector flights 60 are connected to chains 40 and 42 and extend transversely thereto for collecting sludge from the bottom surface 22 and for skimming the top surface of the waste water for collecting scum. In turn, the scum is collected by a scum pipe assembly 15. As will be described in detail below, the flights 60 are buoyant such that each flight 60 has a specific gravity of approximately one (1) which reduces the loads on the other components of the system 10 such as, but not limited to, the chains 40 and 42, the sprockets 44*a*–44*f*, and the sprocket assemblies 36 and 38. The term buoyant, as used herein, refers to the magnitude of the buoyant force, equal to the weight of the volume of waste water displaced by the flight 60, opposing the weight of the flight 60. The term neutrally buoyant refers to the situation where the buoyant force equals the weight of the flight 60. Also, as the flights 60 collect sludge and scum throughout the tank 12, any center deflection of the flights 60 is minimized allowing the flight,, 60 to experience maximum sludge loads for a given size tank. The construction of the flights 60 will be discussed in detail below.

Figure 2:
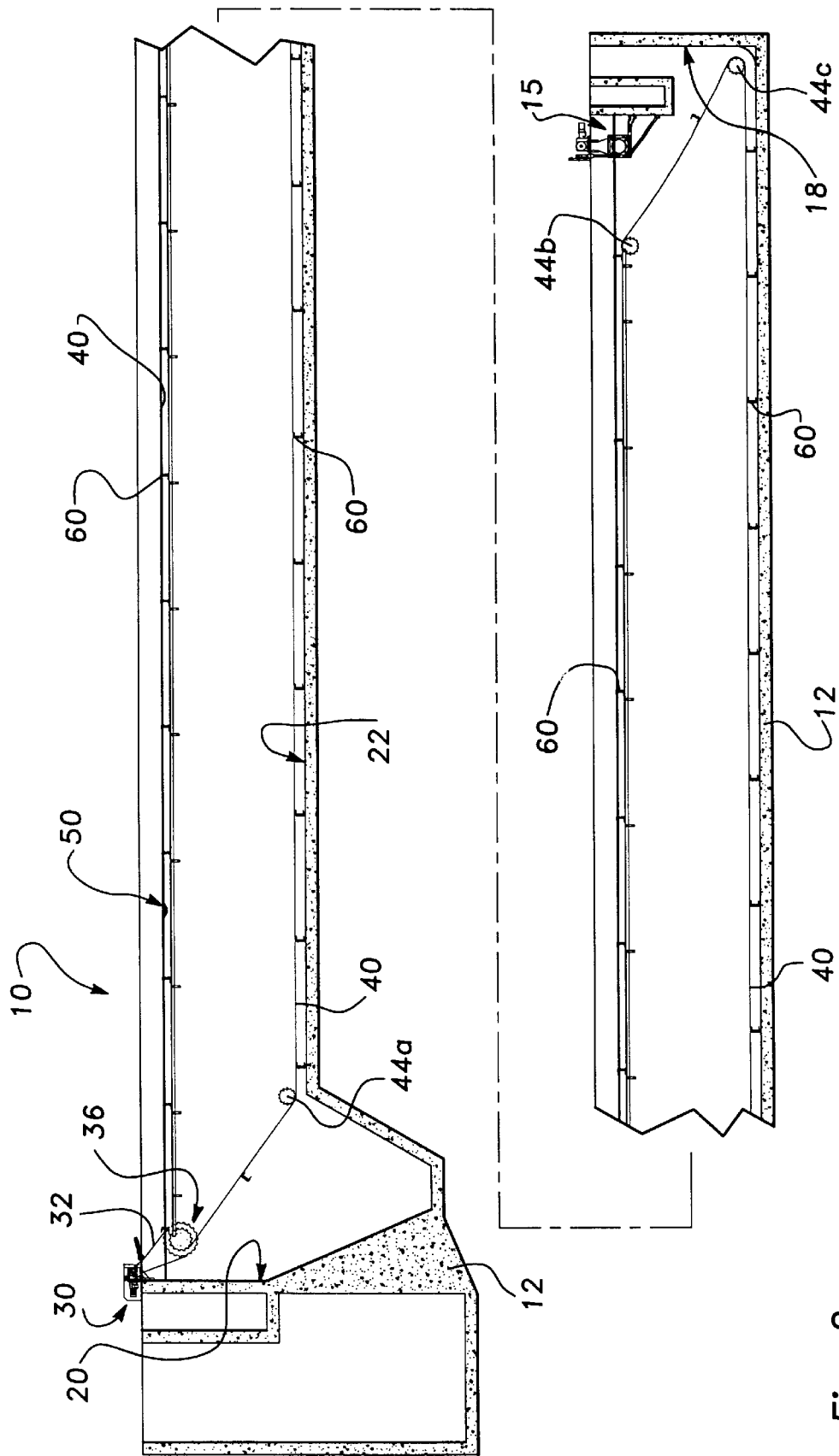
FIG. 2 is a cut away side view, along line 2—2 of FIG. 1, of the clarifier tank and waste water treatment system in accordance with the teachings of the present invention.

FIG. 2 is a cut away side view, along line 2—2 of FIG. 1, of the tank 12 illustrating the series of flights 60 and the waste water level 50. From this view, the flights 60 are shown traveling throughout the tank 12 for removing sludge (not shown) from the bottom surface 22 and scum (not shown) floating on top of the waste water at the waste water level 50. Also, the locations of the chain drive assembly 30, drive chain 32, and dual sprocket assembly 36 are illustrated.

Figure 3:
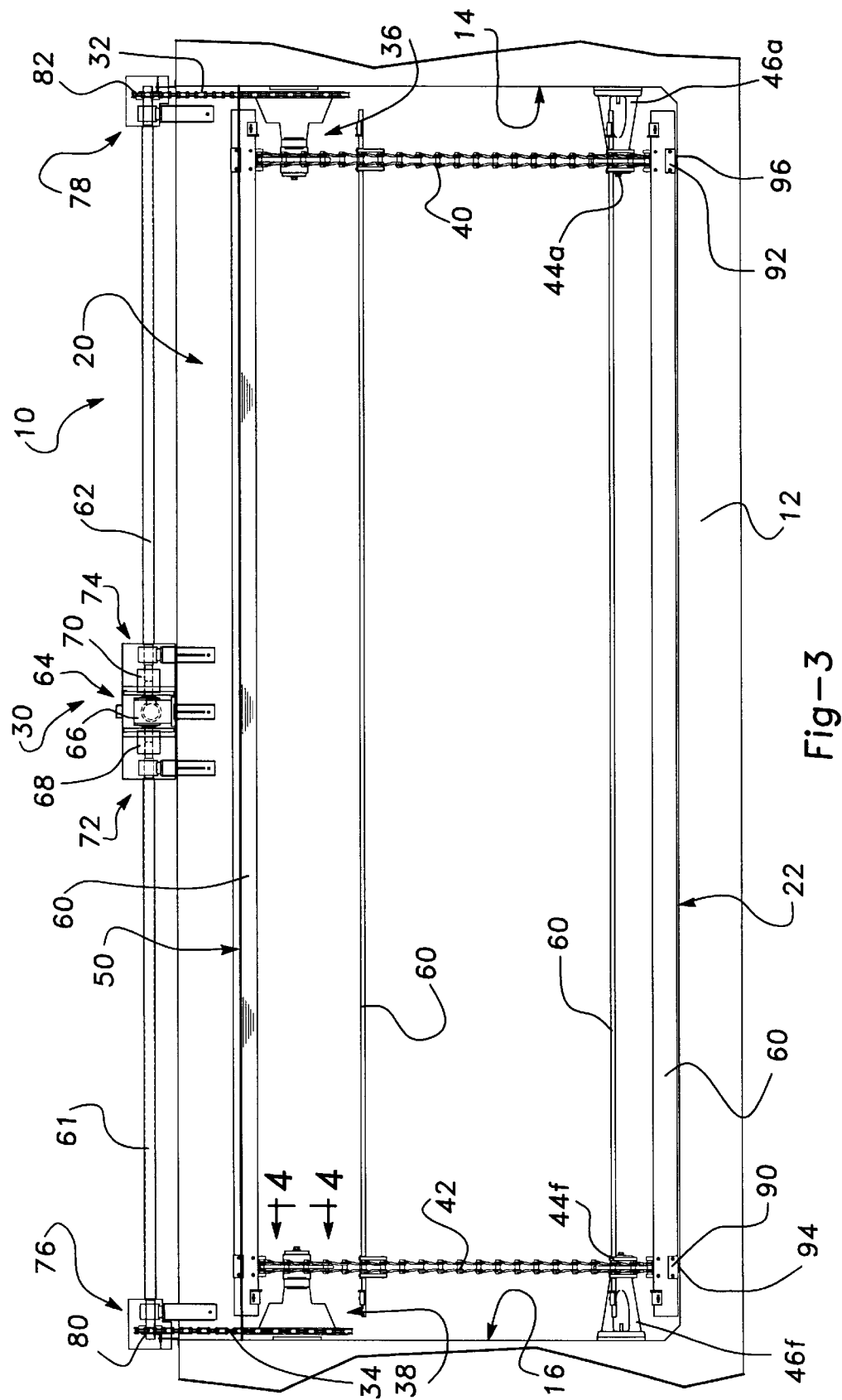
FIG. 3 is a cross section view, along line 3—3 of FIG. 1, illustrating integrated dual sprocket assemblies, collector flights, and chain drive assembly in accordance with the teachings of the present invention.

Turning to FIG. 3, a cross section view, along line 3—3 of FIG. 1, illustrating in detail the motorized chain drive assembly 30 as well as the integrated dual sprocket assemblies 36 and 38. As illustrated, the motorized chain drive assembly 30 is located outside of the waste water level 50 at an end of the tank 12 defined by the end wall 20. A pair of axially aligned drive shafts 61 and 62 each extend across approximately half the width of the tank 12 as defined by side walls 14 and 16. A motorized dual drive subassembly 64 is centered about the end of the tank 12 and is exterior to the waste water level 50. The subassembly 64 includes a motor (not shown) coupled to a gear box 66 which includes dual drives 68 and 70. Ends 72 and 74 of the drive shaft 61 and 62 are coupled to the dual drives 68 and 70, respectively. Drive sprockets 80 and 82 are located at opposite ends 76 and 78 of the drive shafts 61 and 62 for rotation therewith. The details of the drive sprockets 80 and 82 will be described in detail below with reference to FIG. 13.

The drive shafts 61 and 62 are adapted for synchronized rotation such that the drive sprockets 80 and 82 rotate in unison. The drive sprockets 80 and 82 drive the plastic drive chains 32 and 34 which, in turn, drive the dual sprocket assemblies 36 and 38. In turn, the sprocket assemblies 36 and 38 drive the conveyor chains 40 and 42 as well as the flights, 60. As illustrated in this view, the flights 60 skim the top of the waste water level 50 and engage the bottom surface 22 of the tank. The flights 60 include plastic wear shoes 90 and 92 which ride on bottom wear plates or tracks 94 and 96, all of which are of the types disclosed in U.S. Pat. No. 4,645,598 to Hannum.

As will be apparent to one skilled in the art, the use of the dual drive shaft 61 and 62, rather than a conventional single drive shaft extending across the entire width of the tank 12, minimizes any sagging or deflection of the drive shafts 61 and 62 which would otherwise occur with the single drive shaft. Because the drive shafts 61 and 62 are exterior to the corrosive environment of waste water in the tank 12, they may be formed from plastic and/or metallic materials such as steel.

Figure 4:
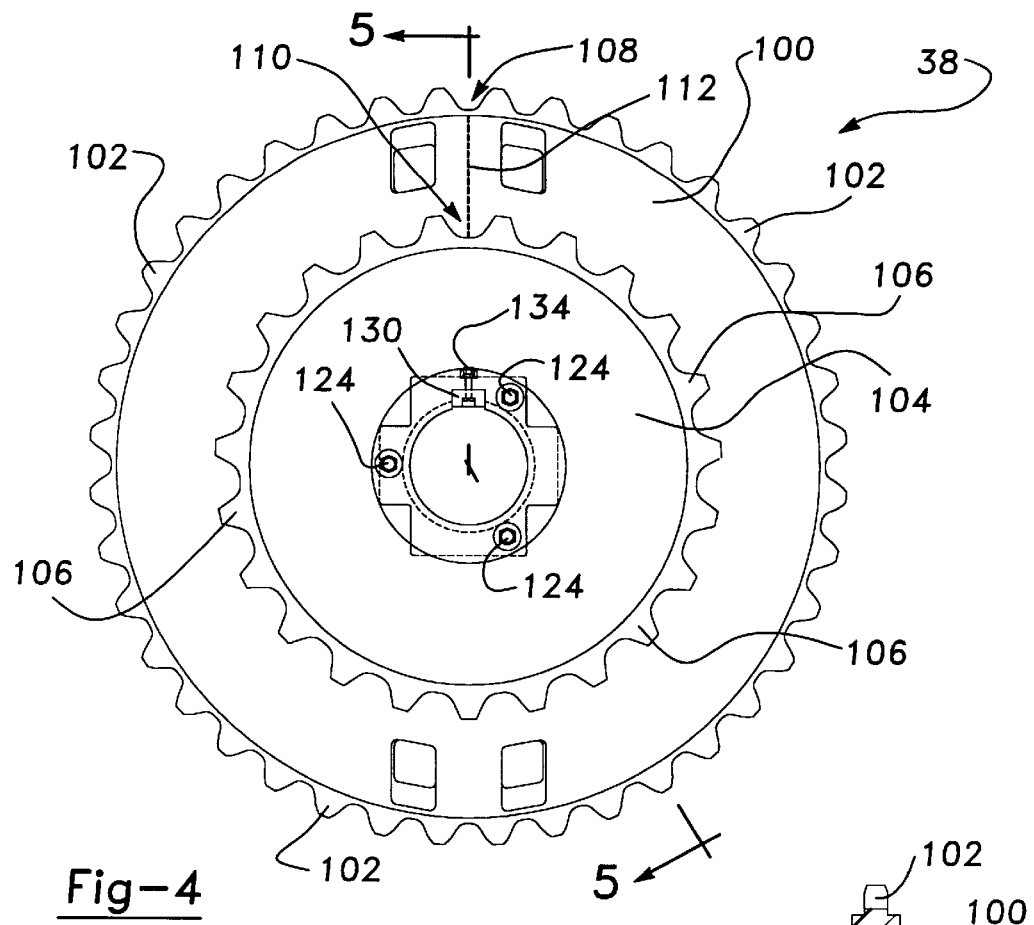
FIG. 4 is a view, along line 4—4 of FIG. 3, of the integrated dual sprocket assembly in accordance with the teachings of the present invention.
Figure 5:
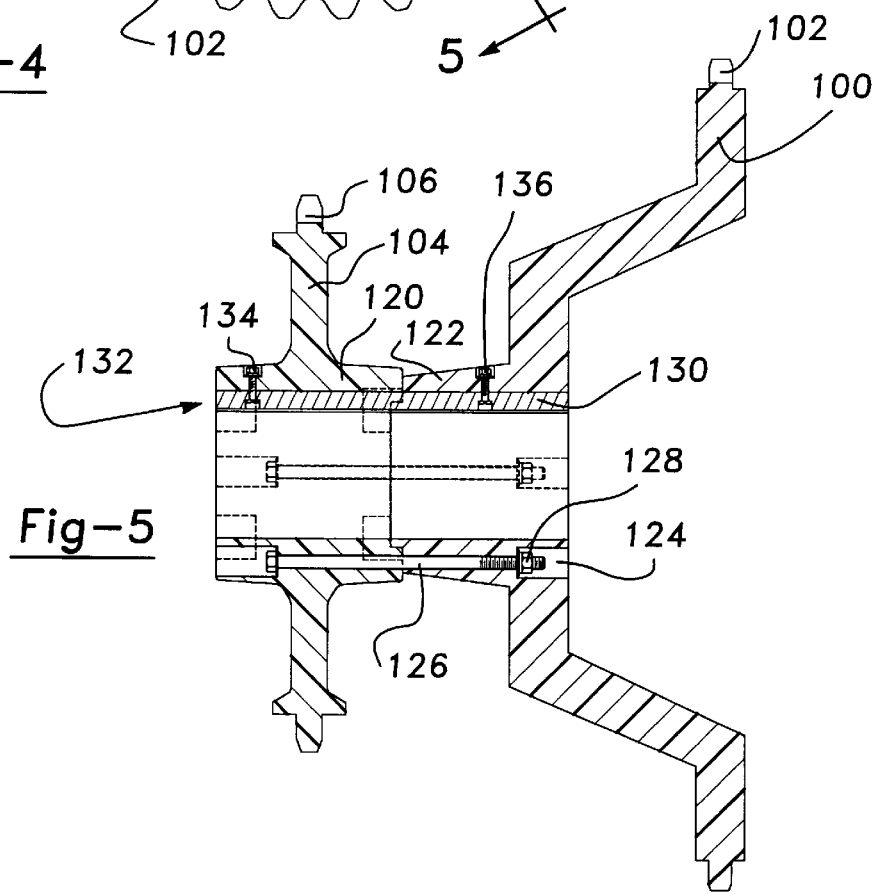
FIG. 5 is a cross sectional view, along line 5—5 of FIG. 4, of the integrated dual sprocket assembly in accordance with the present invention.

Next turning to FIGS. 4 and 5, the details of the integrated dual sprocket assembly 38, which are identical to assembly 36, are shown. The dual sprocket assembly 38 includes a plastic bull sprocket 100, including radially extending teeth 102, and a plastic drive sprocket 104 including radially extending teeth 106. Preferably, the drive sprocket 104 has a pitch of six (6) inches and the bull sprocket 100 has a pitch of 2.609 inches. The sprockets 100 and 104 are coupled to one another and aligned such that the teeth 102 and teeth 106 are synchronized as shown. This is illustrated by the alignment of a root 108, between two of the teeth 102, as well as a root 110, between two of the teeth 106, as represented by dashed line 112.

With reference to FIG. 5, a cut away view, along line 5—5 of FIG. 4, is shown. As illustrated, a hub portion 120 of sprocket 104 abuts and is coupled to a hub portion 122 of sprocket 100 by three (3) fastener assemblies 124. The fastener assembly 124 includes stainless steel bolts 126 and nuts 128 secured within apertures formed in the hub portions 120 and 122. In order to maintain the synchronism and alignment of the teeth 102 and 106, a key member 130 is located in a keyway 132 extending throughout the hub portions 120 and 122. The key member 130 prevents relative movements between the sprockets 100 and 104. Stainless steel bolts 134 and 136 extend through the hub portions 120 and 122 for securing the key member 130 within the keyway 132. As mentioned above, the sprocket assembly 38 is mounted upon the subposts 48b which includes a stub shaft bearing (not shown). It will be understood that sprocket assembly 36 includes identical components as assembly 38. In operation, the sprocket 100 is driven by the drive chain 34 and the sprocket 104 drives the conveyor chain 42. It will be understood that sprockets 100 and 104 may be formed with a single molded hub portion.

FIG. 6 is a front view of one of sludge collector flights 60 that is representative of the other flights in the series. The flight 60 includes a non-metallic elongated main body portion 143 which is attached to the chains 40 and 42 via a pair of non-metallic flight attachment assemblies 140 and 142. Plastic wear shoes members 90, 92, 148 and 150 are attached to the flight 60 for purposes of reducing wear and facilitating travel of the flight 60. Each of the wear shoes 90, 92, 148 and 150 are attached to the flight 60 with stainless stain nut and bolt assemblies 153 extending through the main body portion 143.

FIG. 7 illustrates a bottom view of the flight 60 as attached to portions of the conveyor chains 40 and 42. The non-metallic attachment assemblies 140 and 142 are of identical design and will be described in detail with reference to attachment assembly 140. Attachment assembly 140 includes a pair of parallel non-metallic side plate members 150 and 152 which couple the chain 42 to the flight 60. Similarly, the attachment assembled 142 includes non-metallic parallel side plate members 154 and 156 for coupling the chain 40 to the flight 60.

Figure 9:
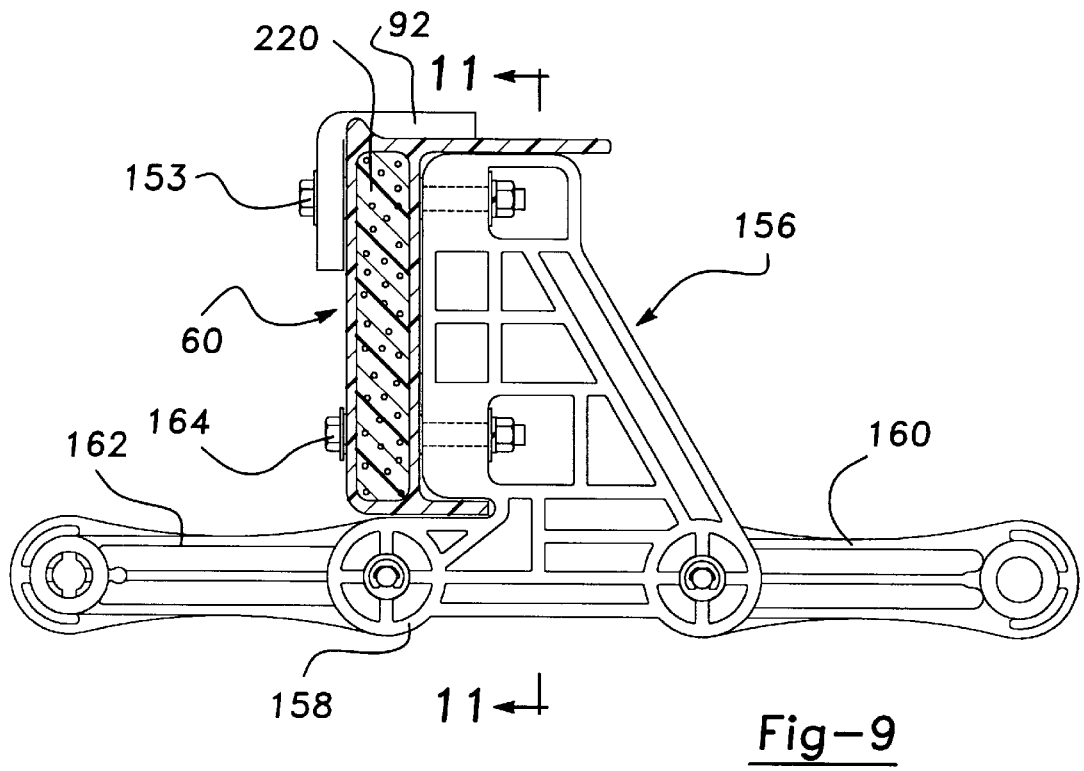
FIG. 9 is a side view, along line 9—9 of FIG. 6, of a section of the conveyor chain and attachment link assembly with the collector flight in accordance with the teachings of the present invention.

With reference to FIG. 9, a side view, along line 9—9 of FIG. 6, illustrating the details of side plate member 156 is shown. As shown, the side plate member 156 includes an integral chain link portion 1!58 which is coupled to side bar portions 160 and 162 of the plastic chain 40. Also shown in this view is the manner in which the flight 60 is attached to the attachment link with stainless steel nut and bolt assembly 153 as well as a second stainless steel nut and bolt assembly 164 both of which extend through portions of the side plate member 156.

Referring to FIG. 8, a cross sectional view, along line 8—8 of FIG. 6, of the flight attachment assembly 140 is shown. As illustrated, a barrel portion 170 of one of the links in the chain 42 is disposed between the side bars 172 and 174 of an adjacent side bar link in the chain 42. The side plates 150 and 152 are located on opposite ends of the side bars 172 and 174 and are coupled thereto via a connecting pin 180 of the assembly 140. The pin 180 includes a metallic bearing member 178 through which a metallic connecting rod 180 extends. The connecting pin 176 is securely coupled to the integral chain link portions 182 and 184 of the side plate members 150 and 152, which are identical to integral chain link portion 158 of side plate member 156, with stainless steel washers 190 and stainless steel snap rings 192. The inclusion of the metallic connecting rod 180 increases the tensile strength of the attachment assembly 140 and allows the chain 42 to experience higher stress loads.

Preferably, the side plates 150 and 152 are manufactured from thermoplastic reinforced nylon resin, and the chains 40 and 42 are preferably NCS-720-S chains having a six (6) inch pitch with a minimum weight of 1.3 lbs. per foot. Preferably, the connecting rod 180 is formed from stainless steel. Each of the links of the chains 40 and 42 are manufactured from thermoplastic polyester resin. The barrel portion 170 is integrally molded with adjacent side bars 194 and 196 to form a link in the chain 42. The use of the non-metallic barrel portion 170 reduces the wear of the chain 42 and its useful life.

Figure 10:
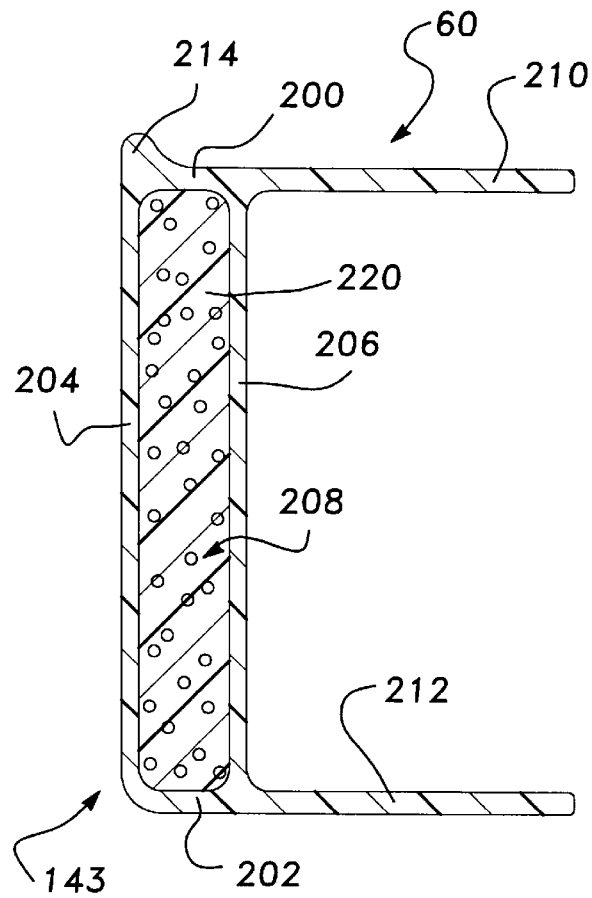
FIG. 10 is a cross sectional view of the collector flight, along line 10—10 of FIG. 6, in accordance with the teachings of the present invention.

With reference to FIG. 10, a view of the flight 60, along line 10—10 of FIG. 6, is shown. As illustrated, the main body portion 143 of the flight 160 includes spaced top and bottom walls 200 and 202 that connect spaced front and rear walls 204 and 206 to define a hollow, interior cavity 208. A pair of integrally molded parallel leg portions 210 and 212 extend perpendicular from the top and bottom of the rear wall 206. An integrally molded raised scraper lip 214 extends from the top wall 200 and extends substantially along the entire length of the main body portion 143. Preferably, the flight 60 is made from a fiberglass reinforced plastic for maximum strength characteristics.

In order to increase the buoyancy of the flights 60 when submerged in the waste water contained in the tank 12, a buoyant foam material 220, i.e. a material with a lower density than plastic, is disposed within the interior cavity 208. The use of the buoyant foam material 220 within the cavity 208 increases the volume of the flight 60 enabling the mass of the main body portion 143 and leg portions 210 and 212 to be maximized while minimizing the overall weight of the flight 60 when submerged. Preferably, the fight 60 has neutral buoyancy with a specific gravity of approximately one (1) when submerged in the waste water. Compared to other types of flights having the same out of water weight as the flight 60, due to the increased mass of the main body portion 143 and leg portions 210 and 212 and the buoyancy of the flight 60, the flight 60 has increased stiffness and exhibits less center deflection for a given sludge load. Additionally, the increased mass and buoyancy of the flight 60 allows the length of the flight 60 to be increased without experiencing center deflection which, in turn, reduces the occurrence of failures within the system 10. Another advantage of the flight 60 is that its buoyancy when submerged creates less loads on the flight attachment links and other components of the system 10.

Returning to FIG. 6, in accordance with a preferred embodiment, metallic plate members 222 and 224 are disposed within opening in the opposite ends of the interior cavity of 208 of the flight 60. Plug members 226 and 228 are also disposed in the openings for substantially sealing the interior cavity 208. The weight of the plate members 222 and 224 may be varied in order to adjust the resulting buoyancy, i.e. the buoyant force acting on the flights 60, for a particular application. One skilled in the art will readily recognize that the plate members 222 and 224 and/or the plug members 226 and 228 may be omitted from the flight member 60 for a particular application.

Figure 11:
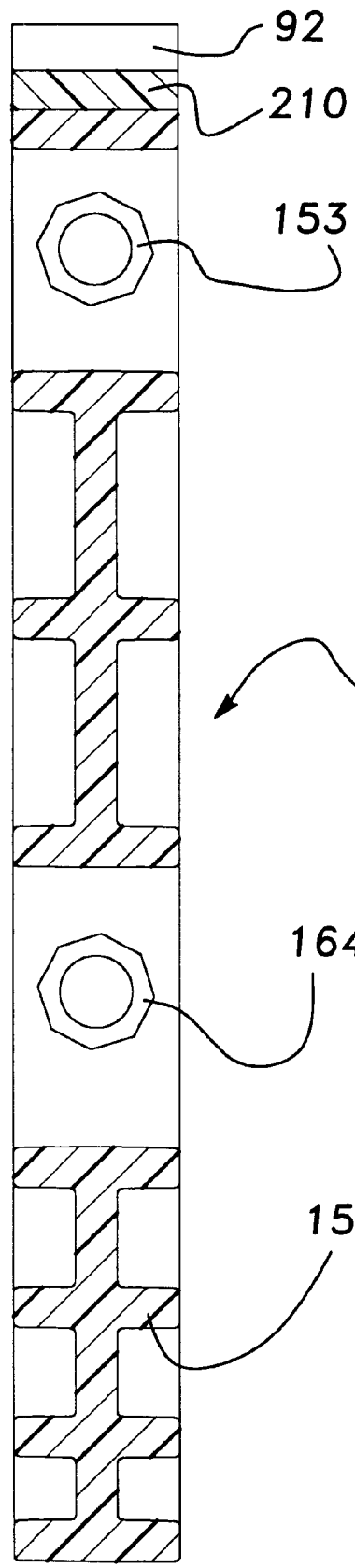
FIG. 11 is a cross sectional view, along line 11—11 of FIG. 9, of the attachment link assembly in accordance with the present invention.

Turning to FIG. 11, a cross sectional view, along line 11—11 of FIG. 9, is shown illustrating the side plate member 156. As illustrated, openings are provided such that access to the nut and bolt assemblies 153 and 164 is facilitated for attaching or removing the flight 60. Additionally, the use of a plastic material minimizes the weight of the plate member 156 while retaining high wear and strength characteristics.

Figure 12:
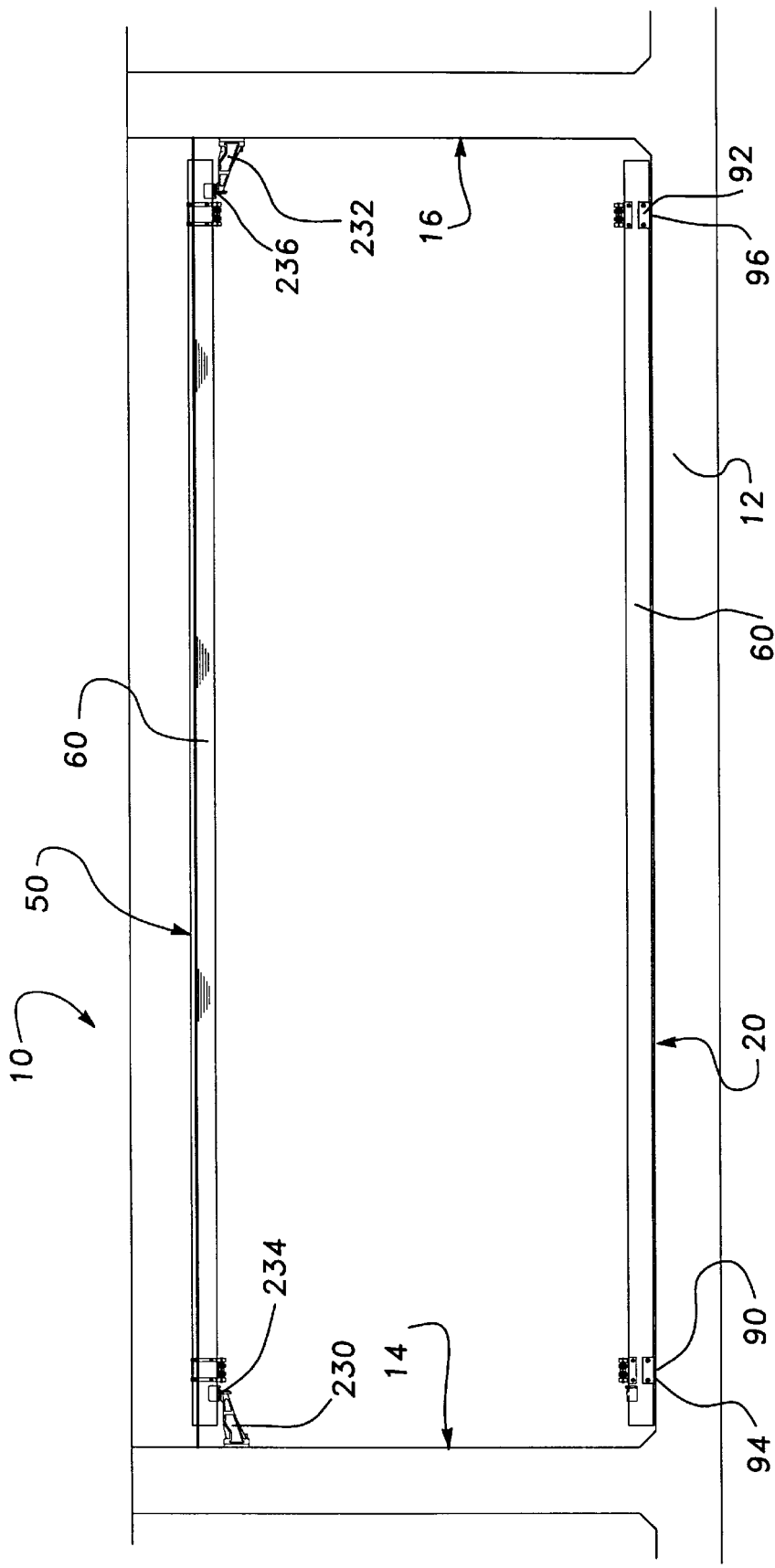
FIG. 12 is sectional view, along line 12—12 of FIG. 1, in accordance with the teachings of the present invention.

Turning to FIG. 12, a view, along line 12—12 of FIG. 1, is shown. From this view, a pair of flights 60 are shown traveling about the bottom surface 20 of the tank 12 as well as partially above the waste water level 50 contained in the tank 12. Return rail wall bracket assemblies 230 arid 232 are mounted about side walls 14 and 16 for supporting the flights 60 as they skim the top of the waste water. Wear strip members 234 and 236, as disclosed in U.S. Pat. No. 4,645,598 to Hannum, are provided to reduce the wear between the members 148 and 150 and the flights 60.

Figure 13:
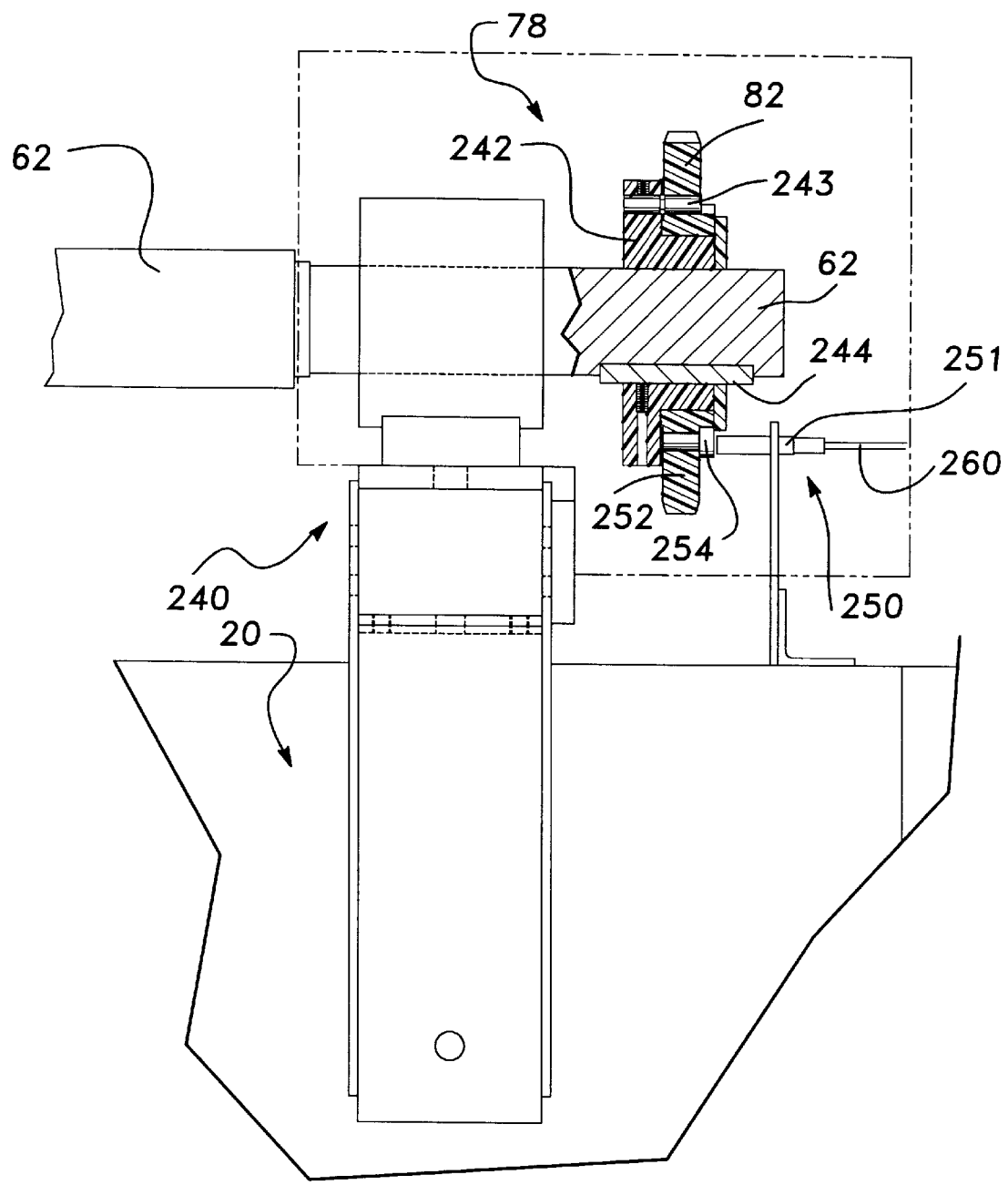
FIG. 13 is a partial cut away view, along line 13—13 of FIG. 1, of one of the drive sprockets and proximity switch assembly in accordance with the teachings of the present invention.

Turning to FIG. 13, a partial cut away view, along line 13—13 of FIG. 1, of the drive sprocket 82 attached to the end 78 of the drive shaft 62 and is illustrated. The following discussion of the drive sprocket 8:2 corresponds also to the identical drive sprocket 80. The end 78 of the drive shaft member 62 rides upon a bearing assembly 240 which, in turn, is coupled to the end wall 20 of the tank 12. Preferably, the drive sprocket 82 is a sheer pin type having a hub portion 242. The size of the sheer pin 243 is chosen such that the pin 243 will break upon experiencing a predetermined relative force between shaft 62 and the hub 242. The hub 242 is coupled to the drive: shaft 62 via a key member 244. The use of a sheer pin type drive sprocket reduces the chances for failure within the system 10.

In order to monitor the respective angular rotations of the drive sprockets 80 and 82 during operation of the system 10, a pair of flux sensing proximity switch assemblies, of which only switch assembly 250 is shown in this view, are employed as part of the chain drive assembly 30. With reference to assembly 250, a flux sensing sensor 251 detects the passing of metallic members located within a web portion 252 of the sprocket 82. One of the metallic members 254 is illustrated in this view. Preferably, six of the metallic members 254 are inserted in the web portion 252 at thirty degree angle (30°) of rotation intervals of the sprocket 82. During operation, a timer within the assembly 250 is set to a time greater than the time required for the sprocket 82 to rotate thirty degrees but less than the time for the sprocket to rotate forty-five degrees. Therefore, if the assembly 250 does not sense the passing of one of the metallic members 254 prior to the expiration of the time required for forty-five degrees of rotation, the assembly 250 will send a signal along lead 260 in order to immobilize the motorized drive assembly 64. As will be apparent to one skilled in the art, the second proximity assembly includes same components and operates as assembly 250 for monitoring the angular rotation of the drive sprocket 80. By way of example, the sensor 251 is of a type available from Perfecto. As such, the combination of the use of the sheer pin type drive sprockets 80 and 82 in conjunction with the flux sensing assemblies minimizes the failure rate for the system 10.

Compared to previous waste water treatment systems used in rectangular clarifying tanks, the system of the present invention operates with increased efficiently due to its lightweight, durability, and high immunity to corrosion. Additionally, the use of the non-metallic collector flights and non-metallic flight attachment assemblies in conjunction with the integrated dual sprocket assemblies and chain drive assembly improves the operation of the waste water treatment system.

The foregoing discloses and describes merely exemplary embodiments of the present invention. One skilled in the art will readily recognize from such discussion and from the accompanying drawings and claims, that various changes, modifications and variations can be made therein without departing from the spirit and scope of the present invention as defined by the following claims.

What is claimed is:

1. In a settling tank partially filled with waste water, an integrated dual sprocket assembly comprising:
    at least two sprocket assemblies, each of said two sprocket assemblies positioned on opposite sides of a settling tank, each of said two sprocket assemblies in mechanical communication with opposite ends of a clarifier flight, each of said two sprocket assemblies being independently driven by a driving device, each of said two sprocket assemblies having:
        a first sprocket with a hub portion and radially extending teeth;
        a second sprocket coupled to said hub of said first sprocket, said second sprocket having a hub portion and radially extending teeth;
        a stub post; and
        wherein said first sprocket and said second sprocket are in rotational engagement with said stub post.

2. An integrated dual sprocket assembly as claimed in claim 1, further comprising a key member located within a keyway extending through said hub portions of said first and second sprockets for preventing relative movement between said first and second sprockets.

3. An integrated dual sprocket assembly as claimed in claim 2, wherein said stub post is rotationally fixed, and wherein said first sprocket, said second sprocket and said key member selectively rotate about said stub post.

4. An integrated dual sprocket assembly as claimed in claim 2, further comprising a bearing positioned around said stub post extending between said stub post and said first and second sprocket.

5. An integrated dual sprocket assembly as claimed in claim 1, wherein said stub post is fixed to a support at a first end and extends substantially the cumulative length of said hub portions of second sprocket and said first sprocket.

6. An integrated dual sprocket assembly as claimed in claim 1, wherein said first sprocket is coupled to said second sprocket by at least a first assembly.

7. An integrated dual sprocket assembly as claimed in claim 5, wherein said first assembly further includes at least one bolt member, said bolt member passing through an aperture in said hub portion of said first sprocket and said hub portion of said second sprocket.

8. An integrated dual sprocket assembly as claimed in claim 5, wherein said hub portion of said first sprocket has a lip portion, said hub portion of said second sprocket has a groove portion, wherein said lip portion interlocks with said groove portion in such a way as to substantially align axes of rotation of said first sprocket and said second sprocket.

9. An integrated dual sprocket assembly as claimed in claim 1, wherein said first sprocket and said second sprocket have differing pitches.

10. A driving assembly for driving clarifier flights in a settling tank partially filled with waste water, comprising:
    a first stub post attached to a first side of a settling tank, said first stub post having a first integrated dual sprocket assembly;
    a second stub post attached to a second side of said settling tank, said second stub post having a second integrated dual sprocket assembly;
    each said integrated dual sprocket assembly having:
        a first sprocket with a hub portion and radially extending teeth;
        a second sprocket with a hub portion and radially extending teeth, said hub portion of said second sprocket being coupled to said hub portion of said first sprocket in such a way as to prevent axial and rotational movement between said first sprocket and said second sprocket;
    a driving device for driving each said first sprocket; and
    a plurality of clarifier flights, each said clarifier flight leaving a first end and a second end, each of said second sprockets being in mechanical communication with a respective end of said clarifier flights, each of said second sprockets driving said respective end, said clarifier flights such that said clarifier flights follow a parallel path.

11. A driving assembly as claimed in claim 10, wherein said first sprocket and said second sprocket has differing pitches.

12. A driving assembly as claimed in claim 10, further comprising a key member located within a keyway extending throughout said hub portions of said first and second sprockets for preventing relative rotational movements between said first and second sprockets.

13. A driving assembly as claimed in claim 12, wherein said stub post is rotationally fixed and said first sprocket, said second sprocket and said key member selectively rotate about said stub post.

* * * * *